Aug. 17, 1943.    S. C. CARNEY    2,327,016
METHOD OF PELLETING CARBON BLACK
Filed June 20, 1941    2 Sheets-Sheet 1

INVENTOR
S. C. CARNEY
BY
Hudson, Young, Shanley & Yunger
ATTORNEY

Patented Aug. 17, 1943

2,327,016

UNITED STATES PATENT OFFICE 2,327,016

METHOD OF PELLETING CARBON BLACK

Samuel C. Carney, Bartlesville, Okla., assignor to Phillips Petroleum Company, a corporation of Delaware Application June 20, 1941, Serial No. 399,029

6 Claims. (Cl. 23—314)

This invention relates to improvements in the manufacture of carbon black. More particularly, it relates to improvements in the manufacture of dustless, spherical granules or pellets from flocculent carbon black or from other agglomerative powdered material without the use of a binder or any other added material whatever.

This invention is a new and useful improvement over the process and apparatus disclosed in United States Patents Numbers 2,120,541; 2,102,054; and Reissue Patent Number 19,750, and is directed specifically to improving the process from one using turbulent agitation as a discontinuous or batch type process to one using turbulent agitation as a continuously operating process.

In the batch process of converting flocculent carbon black or other agglomerative powdered material into dustless, spherical granules or pellets without the use of a binder, the added flocculent carbon black particles are subjected in a dry state to continual impacting by the carbon black in an agitation mechanism and at the same time maintaining them in a state of very vigorous or turbulent agitation. By such continual, vigorous and turbulent agitation, the carbon black particles are caused to agglomerate with each other, resulting in the formation of relatively dustless granules or pellets. Known methods for transforming flocculent carbon black into the relatively dustless pellet form involving the extremely vigorous and turbulent agitation have heretofore been carried out in batch apparatus. The batch operation, similar to many batch operations and processes, is limited in capacity due to time required for charging and discharging the apparatus, power requirements are high, the pelletized product varies in uniformity from batch to batch and within the batch itself, and the operation of pellet formation is difficult to control with respect to rate of agglomeration or pellet formation and size of finished pelletized product.

In the operation of the batch type process, it was found best to use a priming charge not coarser than 60 mesh if an increment of equal volume was to be added in the form of a shell, because the resulting spherical grains produced by such an increment then had a size of about 40 mesh. It was observed that the subjection to turbulent pressure of a charge of spherical grains of carbon black containing a substantial percentage of grains larger than 40 mesh in the batch type of apparatus, resulted in viscosities and pressures so great as to crack and burst the granular agglomerates, thus reproducing sticky, dusty material from the free flowing, dustless charge. For this reason, when treating carbon black by this older batch process under turbulent agitation conditions, it was found advantageous to start with a priming charge not coarser than 60 mesh, with the optimum size being as small as 150 mesh so that a large number of concentric shells could be added before the granules or pellets reached a limiting size substantially larger than 40 mesh and exploded and broke up on account of their relatively large size and unstability.

It was this undesired result which required the use of a priming charge not larger than 60 mesh and required batch operation and limitation of flocculent feed supply to each batch so that granules of 60 mesh would not have sufficient raw material to grow to the large, unstable size.

It is one purpose of this invention to devise a pelletizing process involving pellet formation by the use of the extremely vigorous or turbulent agitation method in which the operation is continuous and therefore subject to control. My improvement avoids the abovementioned undesired result and permits truly continuous operation with continuous introduction of feed, continuous removal of product and continuous supply of priming material sifted from the product. And by my continuous operation, it is possible to make a product of uniform size within desired limits, to operate with a lower power consumption, to permit simple and efficient control of the operation, along with many other advantages inherent in a continuous process.

An object of this invention is to furnish a process for the continuous manufacturing of dustless, spherical granules or pellets from flocculent carbon black or other agglomerative material by turbulent agitation methods.

Another object of this invention is to furnish a process for increasing the output of the dustless, spherical granules or pellets for a given size of apparatus and decreasing the power requirements for ton of granular product.

Still another object of this invention is to furnish a process in which the size and density of the pelleted product may be easily controlled.

Still other objects and advantages will be apparent to those skilled in the art from a careful study of the disclosure to follow.

In achieving these purposes and objects a normally batch apparatus may be converted to one of the continuous type with only a minimum of alterations and a minimum of cost. One such converted apparatus is illustrated in the accompanying drawings in which.

Figure 1:
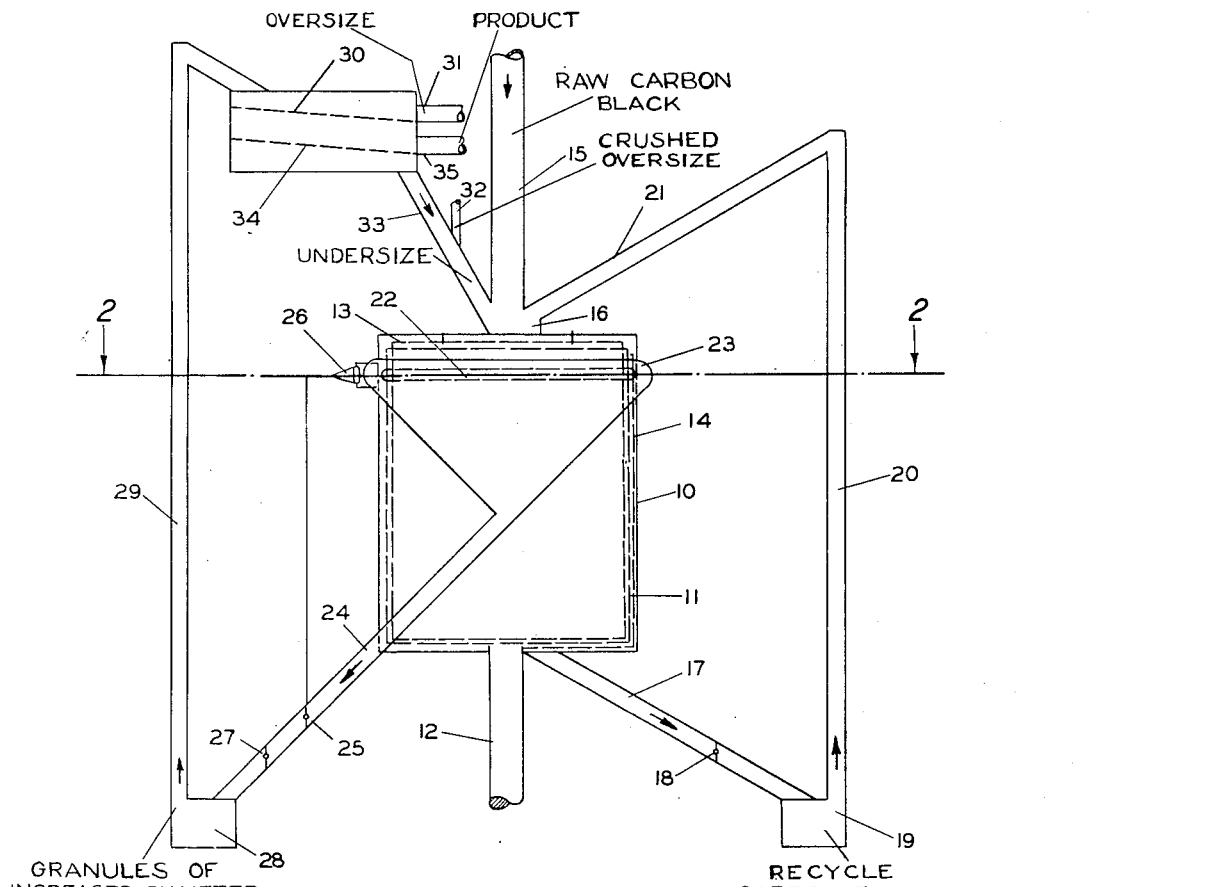
Figure 1 represents a diagrammatic sketch of the front elevation of one form of apparatus in which this invention may be practiced.
Figure 2:
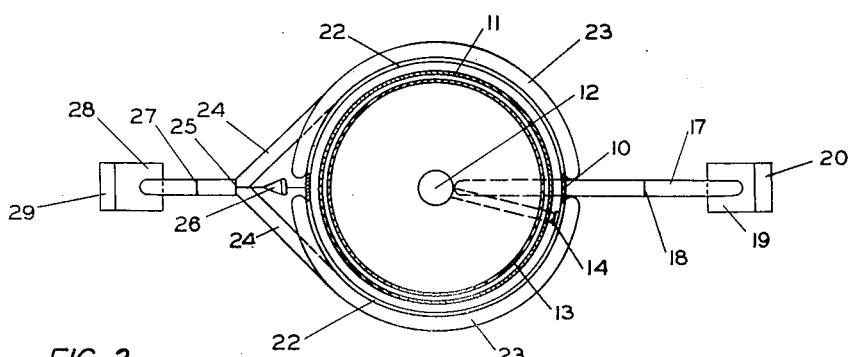
Figure 2 represents a horizontal cross section of the apparatus shown in Figure 1 taken on the line 2—2.

Referring to the figures, and more specifically to Figures 1 and 2, the apparatus comprises a vertically disposed tank or drum 10. Extending downward through the bottom of this drum 10 is a shaft 12 rotated by an exterior source of power, not shown. The apparatus within the drum 10 is identical with that disclosed in the above referred to patents, and consists of a rotatable cage, shown diagrammatically as member 11, an inverted stationary cage, referred to diagrammatically as 13, and a scraper shown diagrammatically as 14. A relative rotary movement is provided between these two cages by rotating the shaft 12 on the top end of which is mounted rigidly the rotatable cage 11. The scraper 14 is rotated from the same source of power but usually at a slower speed than the rotatable cage 11. Charge pipe or tube 15 conducts flocculent black from a source of supply, not shown, into the top center of the drum or tank 10 through the enlarged inlet or section 16. An outlet pipe 17 containing a damper valve 18 empties into sump 19, which in turn makes contact with the lower extremity of elevator 20. Elevator 20 discharges into pipe 21 which empties into the enlarged section 16 of the aforementioned feed line 15.

A horizontal slot 22, about two inches wide, is cut through the front wall of drum 10 at a distance approximately four inches below the top of the rotatable cage 11 and extending approximately half-way around the circumference of the drum, and a similar slot is cut into the rear side of the drum. The front and rear slots 22 open respectively into the front and rear funnels 23 which discharge respectively into front and rear pipes 24. These front and rear pipes 24 join into one downpipe at control valve 25 which may be operated manually or by a known level control device 26 so as to maintain a constant level of material in process within the drum 10.

Material passing control valve 25 also passes damper valve 27 and falls into sump 28, is raised by elevator 29, and falls onto the screen 30. The oversize from screen 30, which is composed of scale and other oversized material, passes from the screening mechanism through pipe 31, thence through a set of rolls or other breaking or crushing means, not shown, and this broken oversize material is conducted therefrom through pipe 32 into pipe 33.

The undersize black passing through screen 30 is sized on a finer screen 34, the oversize passing out through opening 35 as product while the undersize passes through pipe 33 in which it joins the abovementioned crushed oversize black, and the combined stream of fine pellets and broken material passes on down pipe 33 and through the enlarged section 16 into the pelleting drum 10. This material from pipe 33 furnishes at least a portion of the nuclei for the pellet growth.

Figure 3:
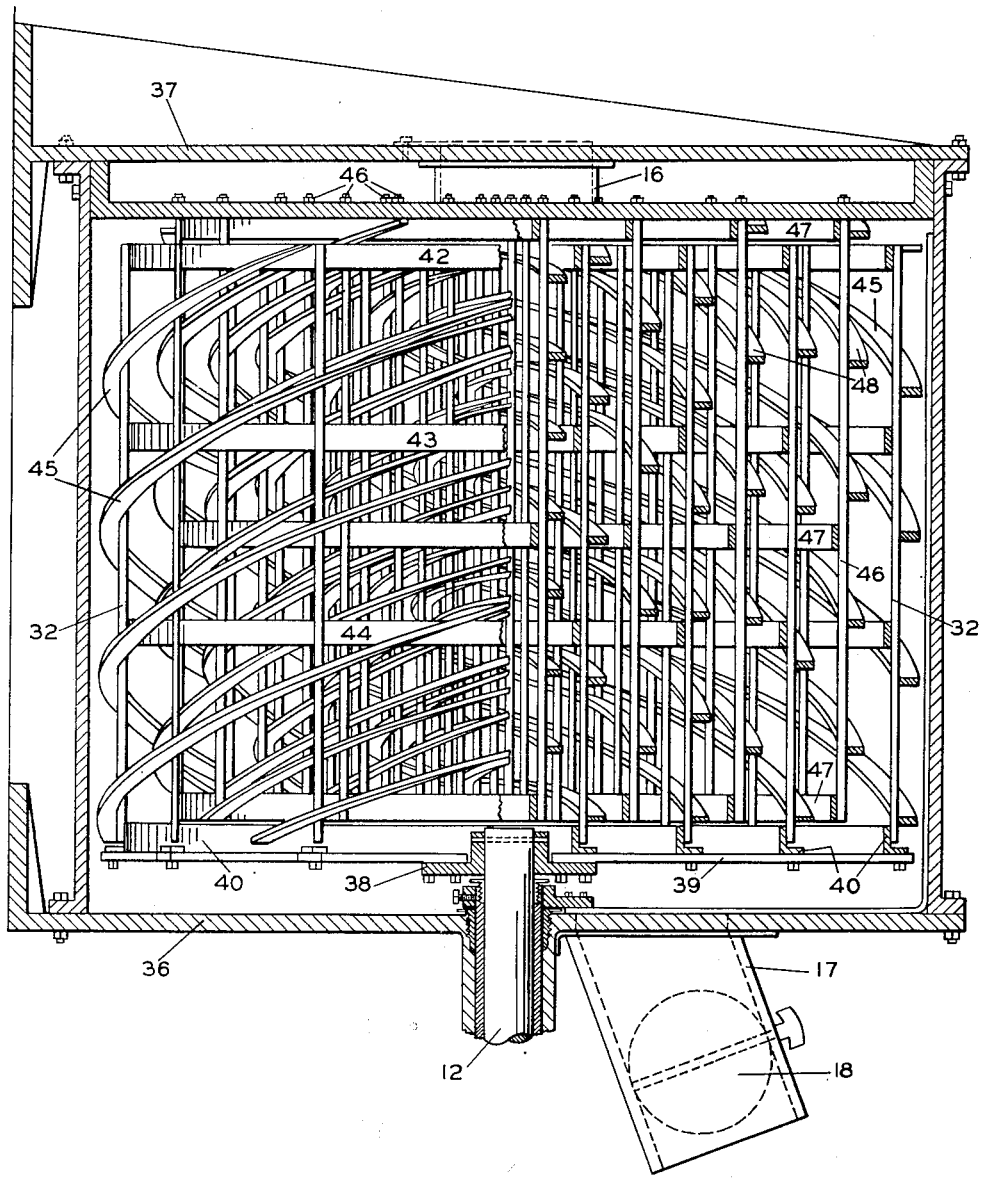
Figure 3 is a view of the apparatus in vertical section substantially as shown in Billings et al., Patent No. 2,120,541.

Referring now to Figure 3, which is a more detailed representation of the drum and constituent elements, the vertically disposed tank or drum 10 is formed from a cylindrical shell flanged and bolted to bottom and top plates, 36 and 37, respectively. Extending through the bottom plate 36 is shaft 12 which is rotated from a source of power, not shown. Mounted on the upper end of the shaft 12 and within the drum 10 is a rotatable cage 11 supported by the flanged collar 38 which is in turn pinned or attached otherwise to the upper end of the shaft. This cage 11 comprises a plurality of radially extending bottom bars 39 supporting thereon four concentric bands 40 disposed edgewise in spaced relation. Carried by each band 40 and extending vertically upward therefrom are a plurality of impelling elements in the nature of parallel vertically disposed rods 41 circular in cross section. The top ends and the intermediate portions of the rods are connected together by similar concentric bands 42, 43 and 44. Also carried by each circular row of rods 41 are one or more helically arranged straps 45.

An inverted cage 13, similar to the rotatable cage 11, is mounted in stationary position on a top plate 37 secured within the upper end of the drum 10. The stationary cage 13 comprises a plurality of circular rows of baffle rods 46, corresponding to the rows of impelling rods 41 and spaced concentrically, carried by and attached to the top plate 37. The rods 46 in each row are connected together by three or more bands 47 and each row of rods also has mounted thereon one or more helically arranged straps 48, the stationary straps 48 being pitched in the same direction as and arranged in a manner similar to the straps 45 on the rotatable cage.

A relative rotary movement is provided between the two cages by rotating the shaft 12 on which is mounted the rotatable cage 11. Inside the cylindrical drum wall and along the bottom plate 36 is a scraper 14 which rotates comparatively slowly for removing carbon black which happens to adhere to the wall or bottom.

When the apparatus substantially as shown in Figure 3 is used in batch operation, as heretofore, the drum 10 is filled nearly to its capacity with flocculent commercial carbon black, or a mixture of commercial carbon black with a priming charge of spherical grain carbon black. The shaft 12 is powered to rotate the rotatable cage 11 and the scraper 14, the latter at a much lower speed than the cage. In an apparatus having a drum of four feet diameter, a cage speed of 45 R. P. M. and a scraper speed of 1½ R. P. M. have been found to be quite satisfactory. The result of this operation is that the charge of carbon black is stirred or churned into a state of turbulence in which the particles are subjected to multi-directional pressure by impact with other particles and by impact against the opposing and impelling surfaces and against the walls of the drum. Under these conditions there occurs an agglomeration of the particles resulting in a progressive and systematic building up of them into spherical granules having hammered or impact-formed surfaces which present the striking characteristics of high density and non-adherent, free flowing contact with each other. It may be stated that the apparent density of the carbon black may be brought to approximately 30 pounds per cubic foot. At this density the granules may be 250 mesh or larger in diameter.

In the operation of my improved process, flocculent carbon black, from a source not shown, passes through line 15, the enlarged section 16 and into the drum 10 at its top center. In the enlarged section 16 this raw flocculent black meets with recycle carbon black which has previously been through the zone of turbulent agitation from pipe 21, and the undersize pelletized black and crushed oversized black from pipe 33. The amount of recycled pelletized black from pipe 21 may be as great as 50 or 100 times the amount of raw black added, and the amount of undersized pelletized and broken black from pipe 33 is relatively small, usually being equal or less than the amount of raw black added. The total volume of the raw, recycle, and the screened blacks entering the pelletizing zone is quite large. This mixture of blacks upon being fed into the relatively quiescent zone in the top center of the drum travels downward and during this travel the blacks are thoroughly mixed and very vigorously and violently agitated. During this period of very vigorous and violent agitation, the flocculent black attaches itself by accretion upon the recycled or recirculated pelletized and screened granules. These particles grow in size by the abovementioned accretion, the larger pellets tending to pass outward and away from the center of the drum due to the centrifugal action caused by rotation of the rotatable cage 11 while the smaller particles tend to remain at and near the center of the drum and at the same time continue on their journey toward the bottom of the drum. A relatively large amount of this black is withdrawn through pipe 17, the withdrawal being manually controlled by adjustment of damper valve 18.

The relatively larger pellets which are thrown progressively toward the periphery of the drum by the abovementioned centrifugal action tend to travel upward due to the "classifying" action of the rotating horizontal and spiral blade, strap and rod members of the rotatable cage 11, shown diagrammatically in the figures. In the outer section of the drum near the periphery, this classifying action becomes quite pronounced and results from the action of the moving rods and spirals, in addition to their intended function in producing turbulent agitation. These rods and spirals serve as rakes or fingers which preferentially move the larger sized granules toward the circumference and upward, the smaller sizes and any unaccreted flocculent black falling into the voids behind and below them. Thus, near the circumference and at the top, the average diameter of granules is slightly greater than near the center and near the bottom of the drum.

This carbon black containing essentially no flocculent black is removed from the circumference near the top of the drum, where the average diameter is greatest and where the granules have received the greatest number of impacts. The removal is through front and rear slots 22 which discharge this pelletized black into the front and rear funnels 23, and these in turn empty into the front and rear pipes 24. These pipes converge into one pipe at control valve 25, and the combined flow of pelletized black passes said valve 25, and auxiliary damper valve 27 and falls into sump 28. Valve 25 may be controlled manually or may be operated by a float control or other mechanism 26. When the level of granules in the drum rises above a certain point, the float mechanism 26 operates and the control valve 25 opens and permits removal of the above-mentioned granules of slightly larger average size which pass through the funnels, outlet pipes, past the control and damper valves and finally into the sump 28.

These granules from sump 28 are raised by elevator 29 and are discharged onto the screen 30, the oversize passing through outlet 31 to be crushed or broken by rolls or other means, not shown, and returned by way of pipe 32 into pipe 33. The undersize from screen 30 is sized on a finer screen 34, the oversize passing through outlet 35 as sized product suitable for packing, while the granules passing through screen 34 are led into pipe 33 in which this undersize meets the broken material from pipe 32 and the mixture passes on through pipe 33 into enlarged section 16 in which it mets the raw flocculent black from pipe 15 and the recycle pelletized black from pipe 21.

My improved process consists not only in the return of the screened undersize to the pelleting zone or drum for further processing but also the continuous recirculation in a closed circuit of material in process. This recirculation system comprises pipe 17 containing a damper valve 18, sump 19, elevator 20 and pipe 21. The granules or material recirculated is removed from the bottom of the pelleting zone or drum and consists of material of average size slightly smaller than that removed from the top of the drum through slots 22, above described. The primary effect of this closed cycle, therefore, is to give the smaller granules in that cycle access to the feed supply equal to that of the larger granules which are preferentially elevated by the turbulent agitation mechanism in drum 10. As can be seen, if the material elevated by 20 be made substantially equal in pounds per hour to the material elevated by the spiral strips and rods of rotatable cage 11, by the proper setting of damper valve 18, all granules of whatever size will have equal access to the raw feed supply.

When all granules have equal access to the raw feed supply, there is a simple mathematical limitation placed on the rate of growth in diameter of the larger ones. This limitation is by reason that the surface of spheres increases as the square of the diameter while the volume of spheres increases as the cube of the diameter. Therefore, with equal and uniform feed distribution, a pound or a cubic foot of small granules has a much larger surface to receive raw feed by accretion than has a pound or a cubic foot of larger granules. Thus, the use of the herein disclosed closed cycle step tends to reduce or to eliminate the preferential tendency of the larger granules to grow still larger. The process does not do this by changing in any way the classifying power of the turbulent agitation mechanism since all material removed from the drum 10 through line 17 is returned to said drum 10 through line 21 in closed cycle operation, and the circulation of the granules by the mechanism within the drum remains the same, with the exception that there is not so much difference in sizes of granules subjected to that classification. This is one reason why throughput may be increased and horsepower per ton of product decreased.

By reason of the greater mass and the greater sphericity of larger granules, the building of a given thickness of shell on them is easier, and since they rotate and flow more readily, a reasonable increase in average diameter of granules being grown, over the minimum at which the batch process starts, is another reason why throughput according to my process is increased and the horsepower requirement per ton of product reduced.

This improvement is not at all concerned with the technical achievement of converting flocculent black to granular black, but instead with the commercially important operation of adding flocculent block by accretion to granules already formed, at the highest practical rate, and with the smallest investment and power cost.

The proper correlation of the opening of valves 18 and 27 puts the average size of granules being grown under the operator's control.

The operation of valve 18 combined with the rate of raw feed admission through pipe 15 places the rate of growth of the selected sizes, and consequently their time of processing and the density of the granular product, under the operator's control also, for example when valve 18 is wide open, granules are removed from the bottom of drum 10 in relatively large amounts. The total volume removed is cycled around and added to the drum 10 through pipe 21. Since black is rapidly removed from drum 10, it must then be flowing in a down draft manner quite rapidly within the center of the drum and hence, has only a limited opportunity to acquire flocculent black by accretion. The result is that a very thin and well compacted layer of flocculent black has been accreted to the surface of any given granule. Upon each trip through the agitation apparatus, a granule acquires an additional layer of flocculent black, until by chance, the granule happens, because of its relatively large size, to be removed from the central, relatively quiescent zone to the outer and upper zone and removed through slots 22. If oversize pellets or if scale removed from the drum sidewalls by scraper 14 is present, this material will be retained on screen 30, crushed or broken and returned to the system through pipes 32 and 33. If of the proper size, the granule will pass screen 30 and will be retained on screen 34 and pass through opening 35 as product, while if too small to be included in product, it will pass through the said screen 34 and be returned along with additional flocculent black and recycle black, and permitted to continue its growth.

With valve 18 wide open and the attendant recycling of large quantities of black in process, raw, flocculent black may be more rapidly added, thereby increasing the rate of throughput. Conversely, with the partial closing of valve 18, then the rate of feeding of flocculent black must be decreased resulting in decreased throughput.

With the above described wide open condition of valve 18, permitting large recycle rates, the classification or sizing effect within the drum is diminished resulting in less differential between the average diameter of pellets leaving the apparatus through slots 22 and the recycle pellets leaving through pipe 17 and re-entering through pipe 21.

Valves 18, 25 and the flow of flocculent black through 15 entering the apparatus, are so adjusted and regulated that the density of product of desired size, the rate of throughput, etc., will be nearest the optimum.

This improved process may be put into operation by placing in drum 10 a previously pelleted charge, or a priming charge as it is called, up to the level of the level controller 23. Continuous operation thereafter is as has been heretofore described. The elimination of several minutes of polishing operation as practiced in the batch operation, together with the elimination of time lost in discharging a batch and charging a new batch, when no raw charge is being pelleted, adds materially to the overall capacity.

It has been observed that ample polishing is accomplished while granules are traversing the distance from the relatively quiescent central part of the active zone to the upper and outer part of drum 10 where product is removed.

The elimination of a period of turbulent agitation in the absence of flocculent feed, reduces the breakage of granules in process and consequently the formation of excessive nuclei by breakage. Since the batch process has usually formed more nuclei than necessary or desirable, and this improved process operates, in principle, with somewhat larger diameter granules to present a large active surface to receive the flocculent material, there will, in most cases, be a sufficient supply of nuclei continuously formed by impact of granules on flocculent material, as distinguished from that supplied by breakage of granules.

Should there be, in any case, an insufficient supply of new nuclei to maintain the average diameter of granules in process at the optimum value, additional nuclei may be supplied by breakage, by the use of any device under the operator's control, which will promote breakage of granules at any point in the process. Such a device may be, for example, a pair of adjustably spaced rolls through which the screened material flowing through line 33 may pass.

While I have attempted to explain to some extent the process of growth or building up of the granules by accretion of flocculent carbon black upon carbon black nuclei, it should be understood that the exact nature and cause of the results attained are not fully understood and that there are undoubtedly other important factors contributing to the success of this process which may become apparent upon continued practice of the process as herein disclosed.

In practicing my invention, I do not wish to be limited by any special type of mechanical apparatus or flow diagram since many modifications or variations may be used by those skilled in the art and yet remain within the scope and spirit of my invention.

I claim:

1. In a continuous process for agglomerating dry, flocculent carbon black comprising continuously adding the dry, flocculent carbon black to carbon black granules, subjecting the mixture to turbulent agitation whereby the carbon black granules of diameter slightly larger than the average rise to the upper and outer portion of the zone of turbulent agitation and the carbon black granules of diameter less than the average settle to the bottom thereof, continuously removing a portion of the carbon black granules of slightly larger average diameter from the upper and outer portion of the zone of turbulent agitation and separating this carbon black into granules of product size and granules other than product size, and continuously returning the carbon black granules other than product size to the top center of the zone of turbulent agitation, and continuously removing a portion of the carbon black granules of slightly smaller average diameter from the bottom of the zone of turbulent agitation and returning this portion of the carbon black granules to the top center of the zone of turbulent agitation.

2. In a continuous process for agglomerating dry, flocculent carbon black comprising continuously adding the dry, flocculent carbon black to carbon black granules, subjecting the mixture to turbulent agitation whereby the carbon black granules of diameter slightly larger than the average, rise to the upper and outer portion of the zone of turbulent agitation and the carbon black granules of diameter less than the average settle to the bottom thereof, continuously removing a portion of the carbon black granules of slightly larger average diameter from the upper and outer portion of the zone of turbulent agitation and separating this carbon black into granules of product size and granules other than product size, and continuously returning the carbon black granules other than product size to the top center of the zone of turbulent agitation, and continuously removing a major portion of the carbon black granules of slightly smaller average diameter from the bottom of the zone of turbulent agitation and returning this portion of the carbon black granules to the top center of the zone of turbulent agitation.

3. In a continuous process for agglomerating dry, flocculent carbon black comprising continuously adding the dry, flocculent carbon black to carbon black granules, subjecting the mixture to turbulent agitation whereby the carbon black granules of diameter slightly larger than the average rise to the upper and outer portion of the zone of turbulent agitation and the carbon black granules of diameter slightly less than the average settle to the bottom thereof, continuously removing a portion of the carbon black granules of slightly larger average diameter from the upper and outer portion of the zone of turbulent agitation and separating this carbon black into granules of product size and granules other than product size, and continuously returning the carbon black granules other than product size to the top center of the zone of turbulent agitation, and continuously removing for recycle a major portion of the carbon black granules of slightly smaller average diameter from the bottom of the zone of turbulent agitation and returning this portion of carbon black granules along with a weight of the dry, flocculent carbon black equal to the weight of the carbon black granules of product size separated, to the top center of the zone of turbulent agitation.

4. In a continuous process for agglomerating dry, flocculent carbon black comprising continuously adding the dry, flocculent carbon black to carbon black granules, subjecting the mixture to turbulent agitation whereby the carbon black granules of diameter slightly larger than the average rise to the upper and outer portion of the zone of turbulent agitation and the carbon black granules of diameter slightly less than the average settle to the bottom thereof, continuously removing a portion of the carbon black granules of slightly larger average diameter from the upper and outer portion of the zone of turbulent agitation and separating this carbon black into granules of product size and granules other than product size, and continuously returning the carbon black granules other than product size to the top center of the zone of turbulent agitation, and continuously removing for recycle a major portion of the carbon black granules of slightly smaller average diameter from the bottom of the zone of turbulent agitation and returning this portion of carbon black granules along with a weight of the dry, flocculent carbon black equal to the weight of the carbon black granules of product size separated, to the top center of the zone of turbulent agitation, and controlling the rate of growth of the granules by controlling the rate of recycle.

5. In a continuous process for agglomerating dry, flocculent carbon black comprising continuously adding the dry, flocculent carbon black to carbon black granules, subjecting the mixture to turbulent agitation whereby the carbon black granules of diameter slightly larger than the average rise to the upper and outer portion of the zone of turbulent agitation and the carbon black granules of diameter slightly less than the average settle to the bottom thereof, continuously removing a portion of the carbon black granules of slightly larger average diameter from the upper and outer portion of the zone of turbulent agitation and separating this carbon black into granules of product size and granules other than product size, and continuously returning the carbon black granules other than product size to the top center of the zone of turbulent agitation, and continuously removing for recycle a major portion of the carbon black granules of slightly smaller average diameter from the bottom of the zone of turbulent agitation and returning this portion of carbon black granules along with a weight of the dry, flocculent carbon black equal to the weight of the carbon black granules of product size separated, to the top center of the zone of turbulent agitation, and controlling the size of the granules being grown by controlling the rate of removal of the carbon black granules from the upper and outer portion of the zone of turbulent agitation.

6. In a continuous process for agglomerating dry, flocculent carbon black comprising continuously adding the dry, flocculent carbon black to carbon black granules, subjecting the mixture to turbulent agitation whereby the carbon black granules of diameter slightly larger than the average rise to the upper and outer portion of the zone of turbulent agitation and the carbon black granules of diameter slightly less than the average settle to the bottom thereof, continuously removing a portion of the carbon black granules of slightly larger average diameter from the upper and outer portion of the zone of turbulent agitation and separating this carbon black into granules of product size and granules other than product size, and continuously returning the carbon black granules other than product size to the top center of the zone of turbulent agitation, and continuously removing for recycle a major portion of the carbon black granules of slightly smaller average diameter from the bottom of the zone of turbulent agitation and returning this portion of carbon black granules along with a weight of the dry, flocculent carbon black equal to the weight of the carbon black granules of product size separated, to the top center of the zone of turbulent agitation and controlling the rate of growth of the granules by limiting the weight of recycled carbon black granules to a maximum of 100 times the weight of the raw black added.

SAMUEL C. CARNEY.